(12) United States Patent
Nomura et al.

(10) Patent No.: US 11,594,811 B2
(45) Date of Patent: Feb. 28, 2023

(54) GLASS SUBSTRATE, LIQUID CRYSTAL ANTENNA AND HIGH-FREQUENCY DEVICE

(71) Applicant: AGC Inc., Tokyo (JP)

(72) Inventors: Shuhei Nomura, Tokyo (JP); Kazutaka Ono, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/550,080

(22) Filed: Dec. 14, 2021

(65) Prior Publication Data

US 2022/0102850 A1     Mar. 31, 2022

Related U.S. Application Data

(63) Continuation of application No. 17/022,365, filed on Sep. 16, 2020, now Pat. No. 11,239,549, which is a
(Continued)

(30) Foreign Application Priority Data

Mar. 20, 2018   (JP) .............................. JP2018-053082

(51) Int. Cl.
   *H01Q 1/38*      (2006.01)
   *H01Q 1/22*      (2006.01)
   (Continued)

(52) U.S. Cl.
   CPC ............. *H01Q 1/38* (2013.01); *H01Q 1/2283* (2013.01); *H01Q 9/0407* (2013.01); *H01Q 15/0013* (2013.01)

(58) Field of Classification Search
   CPC ...... H01Q 1/38; H01Q 1/2283; H01Q 9/0407; H01Q 15/0013
   (Continued)

(56) References Cited

U.S. PATENT DOCUMENTS 5,747,396 A    5/1998  Miyakoshi et al.
9,643,884 B2   5/2017  Ellison et al.
(Continued)

FOREIGN PATENT DOCUMENTS

CN    102923953 A      2/2013
JP    2004-244271 A    9/2004
(Continued)

OTHER PUBLICATIONS

International Search Report dated Jun. 18, 2019 in PCT/JP2019/010424 filed Mar. 13, 2019, 2 pages.
(Continued)

*Primary Examiner* — Peguy Jean Pierre
(74) *Attorney, Agent, or Firm* — Oblon, McClelland, Maier & Neustadt, L.L.P.

(57) ABSTRACT

Provided is a glass substrate with which it is possible to reduce dielectric loss in high-frequency signals, and which also has excellent thermal shock resistance. This invention satisfies the relation {Young's modulus (GPa)×average thermal expansion coefficient (ppm/° C.) at 50-350° C.}≤300 (GPa·ppm/° C.), wherein the relative dielectric constant at 20° C. and 35 GHz does not exceed 10, and the dielectric dissipation factor at 20° C. and 35 GHz does not exceed 0.006.

22 Claims, 1 Drawing Sheet

Related U.S. Application Data continuation of application No. PCT/JP2019/010424, filed on Mar. 13, 2019.

(51) Int. Cl.
*H01Q 9/04* (2006.01)
*H01Q 15/00* (2006.01)

(58) Field of Classification Search
USPC .......................................................... 343/702
See application file for complete search history.

(56) References Cited

U.S. PATENT DOCUMENTS

| | | |
|---|---|---|
| 9,764,981 B2 | 9/2017 | Mauro |
| 10,000,409 B2 | 6/2018 | Ellison et al. |
| 2012/0135852 A1 | 5/2012 | Ellison et al. |
| 2015/0037553 A1 | 2/2015 | Mauro |
| 2015/0051060 A1 | 2/2015 | Ellison et al. |
| 2015/0236412 A1 | 8/2015 | Bily et al. |
| 2015/0236415 A1 | 8/2015 | Bily et al. |
| 2016/0332280 A1 | 11/2016 | Matsui et al. |
| 2017/0186710 A1* | 6/2017 | Yoon ............... H01Q 1/38 |
| 2017/0291845 A1 | 10/2017 | Ellison et al. |
| 2017/0329192 A1 | 11/2017 | Ono et al. |
| 2018/0166780 A1 | 6/2018 | Bily et al. |
| 2019/0210911 A1 | 7/2019 | Ono et al. |
| 2019/0393600 A1 | 12/2019 | Bily et al. |

FOREIGN PATENT DOCUMENTS

| | | | |
|---|---|---|---|
| JP | 2010-30848 | A | 2/2010 |
| JP | 2013-77769 | A | 4/2013 |
| JP | 2014-504250 | A | 2/2014 |
| JP | 2015-512852 | A | 4/2015 |
| JP | 2016-528152 | A | 9/2016 |
| JP | 2016-209987 | A | 12/2016 |
| JP | 2017-506467 | A | 3/2017 |
| JP | 2017-506471 | A | 3/2017 |
| WO | WO 2018/051793 | A1 | 3/2018 |

OTHER PUBLICATIONS

Extended European Search Report issued Dec. 1, 2021, in corresponding European Patent Application 19771064.3.
"Physical Chemistry of Silicate", Nanjing Institute of Chemical Technology, Tianjin University and East China Institute of Chemical Technology, Beijing, China Industry Press, Aug. 31, 1961, p. 340-341 (with machine English language translation).
"Building Decoration Materials". Xiang Calwang, Beijing, China Construction Industry Press, Oct. 31, 1999, p. 75 (with machine English language translation).

* cited by examiner

GLASS SUBSTRATE, LIQUID CRYSTAL ANTENNA AND HIGH-FREQUENCY DEVICE

CROSS REFERENCE TO RELATED APPLICATIONS

This application is a continuation application of prior U.S. application Ser. No. 17/022,365, filed Sep. 16, 2020, the disclosure of which is included herein by reference in its entirety. U.S. application Ser. No. 17/022,365 is a continuation of PCT/JP2019/010424, filed Mar. 13, 2019, the disclosure of which is included herein by reference in its entirety. U.S. application Ser. No. 17/022,365 claims priority to Japanese Application No. 2018-053082, filed Mar. 20, 2018, the disclosure of which is included herein by reference in its entirety.

TECHNICAL FIELD

The present invention relates to a glass substrate, and to a liquid-crystal antenna and a high-frequency device each including the glass substrate.

BACKGROUND ART

In communication appliances such as mobile telephones, smartphones, personal digital assistants, and Wi-Fi appliances and other electronic devices including surface acoustic wave (SAW) devices, radar components, and antenna components, the signal frequencies are being shifted to higher frequencies in order to attain an increase in communication capacity, an increase in communication speed, etc. In general, the circuit boards to be used in communication appliances and electronic devices for such high-frequency applications employ insulating substrates such as resin substrates, ceramic substrates, and glass substrates. Such insulating substrates for use in communication appliances and electronic devices for high-frequency applications are required to be reduced in transmission loss due to dielectric loss, conductor loss, etc., in order to ensure the quality and properties such as strength, of high-frequency signals.

For example, Patent Document 1 discloses that cross-talk noise can be diminished while maintaining a transmission loss at a conventional level, by employing an insulating substrate having a dielectric loss tangent within a specific range and by forming a wiring layer having a wiring width and a surface roughness which are within specific ranges. Patent Document 2 discloses that an electronic-circuit substrate reduced in relative permittivity or dielectric loss is obtained by using a lead-free glass having a specific composition.

Among such insulating substrates, resin substrates intrinsically have low rigidity. Because of this, it is difficult to use resin substrates for semiconductor package products which are required to have rigidity (strength). Ceramic substrates have a drawback in that it is difficult to heighten the surface smoothness thereof and therefore conductor loss arising from the conductor formed on the substrate surface are easy to be increased.

Meanwhile, glass substrates have high rigidity and hence facilitate size or thickness reduction or the like in packages, and also have excellent surface smoothness. Glass substrates further have feature that it is easy to be produced in larger size as substrates.

As a result of the spread of IoT, various devices have come to have a communicating function and there comes to be the need of mounting communication devices even on products such as motor vehicles, in which radio communication has not been performed so far. It has hence been proposed to mount a communication device such as a liquid-crystal antenna on the roof of a motor vehicle to communicate with satellites (see Patent Documents 3 and 4).

CITATION LIST

Patent Literature

Patent Document 1: JP-A-2013-077769
Patent Document 2: JP-A-2004-244271
Patent Document 3: JP-T-2017-506467 (The term "JP-T" as used herein means a published Japanese translation of a PCT patent application.)
Patent Document 4: JP-T-2017-506471

SUMMARY OF INVENTION

Technical Problem

However, the conventional glass substrates have large values of dielectric loss tangent especially in the GHz band and it is difficult therewith to maintain quality, strength, and other properties of high-frequency signals. Furthermore, in cases when conventional glass substrates are to be perforated and used as perforated substrates, the glass substrates are prone to be cracked by thermal shocks caused by temperature differences therein during laser processing for the perforation.

Meanwhile, in contrast to antennas intended to be used outdoors, communication devices have hitherto been used mainly indoors or in protected spaces. However, in cases when liquid-crystal antennas and the like are attached to motor vehicles, ships, and the like, these appliances are used in severe environments involving considerable temperature fluctuations. Because of this, the liquid-crystal antennas and the like, which are in the state of being exposed to the outside air, are thought to be exposed to abrupt temperature changes, for example, when the liquid-crystal antennas and the like in the state of being hot in sunshine are suddenly cooled by rain. In such applications, the conventional glass substrates used in electronic devices are prone to be cracked by thermal shocks due to abrupt temperature changes.

Under these circumstances, an object of the present invention is to provide: a glass substrate which can reduce the dielectric loss of high-frequency signals and has excellent thermal-shock resistance; and a liquid-crystal antenna and a high-frequency device each employing the glass substrate.

Solution to the Problem

The present inventors diligently made investigations in order to overcome the problems and, as a result, have discovered that a glass substrate can be made to have excellent resistance to thermal shocks caused by abrupt temperature changes, by regulating the product of the Young's modulus and the average coefficient of thermal expansion at 50-350° C. to a value not larger than a given value. This glass substrate is hence suitable, for example, for use as a substrate for liquid-crystal antennas and the like, which are used in environments involving considerable temperature fluctuations, or as a substrate for high-frequency circuits which is subjected to perforation with a laser, etc.

The glass substrate of the present invention satisfies the following relationship:

{[Young's modulus (GPa)]×[average coefficient of
thermal expansion at 50-350° C. (ppm/° C.)]
}≤300 (GPa·ppm/° C.), and has a relative permittivity as measured at 20° C. and 35 GHz of 10 or less and a dielectric loss tangent as measured at 20° C. and 35 GHz of 0.006 or less.

In one aspect of the glass substrate of the present invention, the glass substrate is for use in a liquid-crystal antenna or a high-frequency circuit.

The present invention further provides, in one aspect thereof, a liquid-crystal antenna or a high-frequency device each including the glass substrate.

Advantageous Effects of the Invention

The glass substrate of the present invention can reduce the dielectric loss of high-frequency signals. This glass substrate further has excellent thermal-shock resistance and is hence suitable, for example, as a substrate to be used in an environment where the temperature fluctuates considerably or as a substrate to be perforated with a laser, etc. This glass substrate hence makes it possible to provide a liquid-crystal antenna and a high-frequency device which have high performance and are practical.

DESCRIPTION OF EMBODIMENTS

The present invention will be explained below in detail, but the present invention should not be limited to the following embodiments and can be modified at will within the gist of the present invention. Furthermore, the symbol "-" indicating a numerical range is used as a denotation of a range including the numerical values before and after the symbol "-" as a lower limit value and an upper limit value.

The contents of components of the glass substrate are each given in mole percentage on an oxide basis unless otherwise indicated. The term "high frequency" means a frequency of 10 GHz or higher, and is preferably higher than 30 GHz, more preferably 35 GHz or higher.

<Glass Substrate>

The glass substrate (hereinafter often referred to simply as "substrate") of the present invention is characterized by satisfying the relationship {[Young's modulus (GPa)]×[average coefficient of thermal expansion at 50-350° C. (ppm/° C.)]}≤300 (GPa·ppm/° C.) and having a relative permittivity as measured at 20° C. and 35 GHz of 10 or less and a dielectric loss tangent as measured at 20° C. and 35 GHz of 0.006 or less.

Since the value represented by {[Young's modulus (GPa)]×[average coefficient of thermal expansion at 50-350° C. (ppm/° C.)]} (hereinafter often referred to as "Expression 2") is 300 GPa·ppm/° C. or less, the substrate receives reduced stress even when strained by a difference in thermal expansion and hence has improved thermal-shock resistance.

The value represented by Expression 2 is preferably 280 GPa·ppm/° C. or less, more preferably 250 GPa·ppm/° C. or less, still more preferably 220 GPa·ppm/° C. or less, yet still more preferably 200 GPa·ppm/° C. or less. Meanwhile, there is no particular lower limit thereon, but the value represented by Expression 2 is preferably 100 GPa·ppm/° C. or higher from the standpoints of ensuring the rigidity of the substrate and obtaining the substrate easy to be produced.

As the Young's modulus decreases, the value represented by Expression 2 becomes smaller and the stress imposed on the substrate becomes lower, resulting in increase in thermal-shock resistance. Because of this, the Young's modulus of the glass substrate is preferably 70 GPa or less, more preferably 67 GPa or less, still more preferably 64 GPa or less, yet still more preferably 60 GPa or less.

Meanwhile, in the case where the glass substrate is for use in high-frequency circuits, the glass substrate has a Young's modulus of preferably 40 GPa or higher, more preferably 50 GPa or higher, still more preferably 55 GPa or higher, from the standpoint of inhibiting the substrate from being deflected in high-frequency device production steps (wafer process) and thereby inhibiting the occurrence of production failures, etc.

The Young's modulus can be regulated by changing the composition and heat history of the glass to be used as the substrate. The Young's modulus can be measured by an ultrasonic pulse method in accordance with the method specified in JIS Z 2280 (year 1993).

A strain due to a thermal shock occurs as a result of thermal expansion or contraction due to a temperature difference between two points within the glass. Even under the same temperature difference, a lower coefficient of thermal expansion results in a smaller strain and hence in an increase in thermal-shock resistance. Because of this, it is preferable that the average coefficient of thermal expansion at 50-350° C. is low. The average coefficient of thermal expansion at 50-350° C. is preferably 5 ppm/° C. or less, more preferably 4 ppm/° C. or less, still more preferably 3.5 ppm/° C. or less, yet still more preferably 3.3 ppm/° C. or less. Furthermore, by making the average coefficient of thermal expansion low, differences in thermal expansion coefficient between this substrate and other members can be more suitably regulated during production of a device or the like employing the substrate.

There is no particular lower limit thereto, but the average coefficient of thermal expansion at 50-350° C. is preferably 1.0 ppm/° C. or higher, more preferably 2.0 ppm/° C. or higher, from the standpoint of obtaining thermal properties suitable for forming.

The coefficient of thermal expansion can be regulated by changing the contents of, in particular, alkali metal oxides or alkaline-earth metal oxides among the components of the glass to be used as the substrate or by changing the heat history of the glass.

The average coefficient of thermal expansion at 50-350° C. can be determined with a differential thermodilatometer in accordance with the method specified in JIS R3102 (year 1995).

By reducing the relative permittivity and dielectric loss tangent of the glass substrate, the dielectric loss in a high-frequency range can be reduced.

At 20° C. and 35 GHz, the glass substrate has a relative permittivity of 10 or less and a dielectric loss tangent (tan δ) of 0.006 or less. The relative permittivity is preferably 8 or less, more preferably 6 or less, still more preferably 5 or less, yet still more preferably 4.5 or less. The relative permittivity is usually 4.0 or higher although there is no particular lower limit thereon. The dielectric loss tangent is preferably 0.005 or less, more preferably 0.004 or less, still more preferably 0.0035 or less, yet still more preferably 0.003 or less. The dielectric loss tangent is usually 0.0005 or higher although there is no particular lower limit thereon.

At 20° C. and 10 GHz, the glass substrate preferably has a relative permittivity of 10 or less and a dielectric loss tangent (tan δ) of 0.006 or less. The relative permittivity is more preferably 8 or less, still more preferably 6 or less, yet still more preferably 5 or less, especially preferably 4.5 or less. The relative permittivity is usually 4.0 or more each, although there is no particular lower limit thereon. The dielectric loss tangent is more preferably 0.005 or less, still more preferably 0.004 or less, yet still more preferably 0.0035 or less, especially preferably 0.003 or less. The dielectric loss tangent is usually 0.0005 or higher although there is no particular lower limit thereon.

It is preferable that the values of relative permittivity and dielectric loss tangent as measured at 20° C. and 35 GHz are made close respectively to the values of relative permittivity and dielectric loss tangent as measured at 20° C. and 10 GHz to reduce the frequency dependence (dielectric dispersion), thereby making frequency characteristics of dielectric characteristics less apt to change and causing only a slight design change even when frequency for use is different.

The relative permittivity and the dielectric loss tangent can be regulated by changing the composition of the glass to be used as the substrate.

The relative permittivity and the dielectric loss tangent can be measured in accordance with the method specified in JIS R1641 (year 2007) using a cavity resonator and a vector network analyzer.

In a glass substrate, a crack due to a thermal shock is prone to occur from an end surface of the substrate. Because of this, the lower the surface roughness of the end surfaces of the substrate, the lower the degree of stress concentration and the higher the thermal-shock resistance. The end surfaces of the substrate have a surface roughness, in terms of arithmetic mean roughness Ra, of preferably 1.5 nm or less, more preferably 1.0 nm or less, still more preferably 0.8 nm or less, yet still more preferably 0.5 nm or less, especially preferably 0.3 nm or less. The end surfaces of the glass substrate are the surfaces parallel with the thickness direction of the substrate.

The term "arithmetic mean roughness Ra" means a value obtained in accordance with JIS B0601 (year 2001).

Examples of methods for regulating the surface roughness of the end surfaces to a value within that range include processing techniques such as a polishing treatment and etching in which a chemical, e.g., hydrofluoric acid, is used.

Examples of the polishing treatment include: mechanical polishing in which an abrasive material including cerium oxide, colloidal silica, or the like as a main component and a polishing pad are used; chemical mechanical polishing in which a polishing slurry including an abrasive material and an acidic or alkaline liquid as a dispersion medium and a polishing pad are used; and chemical polishing in which an acidic liquid or an alkaline liquid is used as an etchant. Any of these polishing treatments is used in accordance with the surface roughness of the glass sheet to be used as the material of the glass substrate. For example, preliminary polishing and finish polishing may be used in combination.

Since the substrate is prone to suffer breaking, cracking, chipping, or the like which occurs from the end surfaces, it is preferable that at least a part of the end surfaces have been chamfered in order to improve the strength of the substrate. It is more preferred to form an end-surface chamfer shape having an obtuse angle, because a further improvement in strength is attained thereby. Examples of modes of chamfering include C-chamfering, R-chamfering, and light-chamfering. Two or more of these may be used in combination to form a chamfer of a complicated shape. Preferred of those are C-chamfering and R-chamfering.

C-chamfering is a chamfering method in which a corner portion between a main surface and an end surface is cut off obliquely. The angle formed by the surface perpendicular to the main surface of the substrate and the surface formed by cutting off the corner portion is preferably 120° or larger, more preferably 135° or larger, still more preferably 175° or larger.

R-chamfering is a chamfering method which forms a chamfer shape that is round as compared with ones formed by C-chamfering.

The chamfer surface resulting from the chamfering preferably has an arithmetic mean roughness Ra of 0.2 μm or less. The "arithmetic mean roughness Ra" is a value measured by a method according to JIS B0601:2001 under the conditions of an evaluation length of 8 mm, a cut-off value λc of 0.8 mm, and a cut-off ratio λc/λs of 100. By thus regulating the surface roughness thereof, cracking generating from the chamfer surface become less apt to occur. Examples of methods for regulating the arithmetic mean roughness Ra of the chamfer surface to 0.2 μm or less include a method in which the chamfer surface is polished with a diamond film of #1000-3000.

The main surface of the glass substrate is a surface on which wiring layer is formed in using the substrate, for example, in high-frequency circuits. The main surface preferably has a surface roughness of 1.5 nm or less in terms of arithmetic mean roughness Ra. This is because a wiring layer which is suffering a skin effect can be reduced in the skin resistance even in a high-frequency range exceeding 30 GHz, thereby attaining a reduction in conductor loss. The arithmetic mean roughness Ra of the main surface of the substrate is more preferably 1.0 nm or less, still more preferably 0.5 nm or less.

Such surface roughness of the main surface can be attained by subjecting the main surface to a polishing treatment or the like according to need. For the polishing treatment, the same method as the polishing treatment for the end surfaces can be employed.

The shape of the substrate is not particularly limited. However, it is preferable that one of the main surfaces has an area of 100 $cm^2$ or larger, from the standpoint of the transmission/reception efficiency of antennas, etc. The area thereof is more preferably 225 $cm^2$ or larger. Meanwhile, the area thereof is preferably 100,000 $cm^2$ or less from the standpoint of handleability of the substrate, and is more preferably 10,000 $cm^2$ or less, still more preferably 3,600 $cm^2$ or less.

The thickness of the substrate is preferably 0.01 mm or larger from the standpoint of maintaining the strength of the substrate, and is more preferably 0.05 mm or larger. From the standpoint of enhancing the ultraviolet-shielding ability to make it possible to protect resins which are deteriorated by ultraviolet light, the thickness of the substrate is still more preferably 0.1 mm or larger, yet still more preferably larger than 0.2 mm.

Meanwhile, from the standpoints of attaining thickness reduction and size reduction in high-frequency devices employing high-frequency circuits or in liquid-crystal antennas, and the standpoints of attaining an improvement in the efficiency of production thereof, etc., the thickness of the substrate is preferably 2 mm or less, more preferably 1 mm or less. Furthermore, the thickness thereof is still more preferably 0.7 mm or less, yet still more preferably 0.5 mm or less, from the standpoint of heightening the ultraviolet transmittance to make it possible to use an ultraviolet-curable material in steps for producing devices, antennas, etc., thereby heightening the production efficiency.

The Vickers hardness of the substrate is preferably 400 or higher because the substrate having such hardness is less apt to crack upon reception of a mechanical shock, and is more preferably 450 or higher, still more preferably 500 or higher. The Vickers hardness thereof is preferably 550 or less.

The Vickers hardness can be regulated by changing the glass composition in the substrate. The Vickers hardness can be measured by a method according to JIS R1310 (2003).

The cracking load of the substrate is preferably higher than 1.96 N, more preferably 4.9 N or higher, still more preferably 9.8 N or higher, especially preferably higher than 19.6 N, because the substrate having such cracking load is less apt to crack upon reception of a mechanical shock.

The cracking load can be regulated by changing the glass composition or heat history in the substrate or by changing a surface processing to be given to the substrate. The cracking load can be determined using a Vickers hardness meter by measuring a load at which the rate of crack occurrence exceeds 50%.

The density of the substrate is preferably 2.5 g/cm$^3$ or less, more preferably 2.4 g/cm$^3$ or less, still more preferably 2.35 g/cm$^3$ or less, yet still more preferably 2.3 g/cm$^3$ or less, from the standpoints of attaining a weight reduction in devices, antennas, or the like employing the substrate and of reducing the brittleness of the glass to make the substrate less apt to crack against thermal shock or mechanical shock. The density thereof is usually 2.0 g/cm$^3$ or higher, although there is no particular lower limit thereon. The density can be measured by Archimedes method.

It is preferable that at least one main surface of the substrate has a compressive stress layer formed in at least a part thereof, from the standpoint of making the substrate less apt to crack against thermal shock or mechanical shock. The compressive stress layer can be formed, for example, by a strengthening treatment, and either a physical strengthening treatment or a chemical strengthening treatment can be employed. For both the physical strengthening treatment and the chemical strengthening treatment, conventionally known methods can be used.

The porosity of the substrate is preferably 0.1% or less, more preferably 0.01% or less, still more preferably 0.001% or less, from the standpoint that such porosity is effective in producing high-frequency devices inhibited from suffering noises, etc. In the case of liquid-crystal antennas, the porosity of the substrate is preferably 0.0001% or less from the standpoint of inhibiting wiring failures due to exposure of open pores in the surface.

The porosity can be determined by examining the bubbles contained in the glass substrate with an optical microscope, determining the number and diameters of the bubbles, and calculating the volume of bubbles contained per unit volume.

The substrate preferably has a transmittance for light having 350-nm wavelength of 50% or higher, because such transmittance makes it possible to use an ultraviolet-curable material in laminating steps, etc. in producing high-frequency devices, antennas, etc., thereby heightening the production efficiency. The transmittance thereof is more preferably 70% or higher from the standpoints of reducing the period of irradiating the ultraviolet-curable material with ultraviolet light in steps for producing devices, antennas, etc. and reducing the thickness-direction unevenness in curing of the ultraviolet-curable material.

For the same reasons as shown above, the substrate has a transmittance for light having 300-nm wavelength of preferably 50% or higher, more preferably 60% or higher, still more preferably 70% or higher. The substrate has a transmittance for light having 250-nm wavelength of preferably 5% or higher, more preferably 10% or higher, still more preferably 20% or higher.

Meanwhile, in the case of employing members made of resins that are deteriorated by ultraviolet light for producing devices, antennas, and the like, the transmittance for light having 350-nm wavelength is preferably 80% or less, more preferably 60% or less, still more preferably 30% or less, most preferably 10% or less, from the standpoint of imparting ultraviolet-shielding ability to the substrate to enable the substrate to function as a protective material.

For the same reason as shown above, the substrate has a transmittance for light having 300-nm wavelength of preferably 80% or less, more preferably 60% or less, still more preferably 30% or less, yet still more preferably 10% or less. The transmittance for light having 250-nm wavelength is preferably 60% or less, more preferably 30% or less, still more preferably 10% or less, yet still more preferably 5% or less.

The light transmittances of the substrate for the respective wavelengths can be measured with a visible-ultraviolet spectrophotometer, and external transmittances including a loss due to reflection are used.

The β-OH of a substrate is a value used as an index to the water content of the glass, and is determined by examining the glass substrate for the absorbance of light having a wavelength of 2.75-2.95 μm and dividing the maximum value $β_{max}$ thereof by the thickness (mm) of the substrate.

Regulating the β-OH value thereof to 0.8 mm$^{-1}$ or less is preferred because this enables the substrate to have further improved low-dielectric-loss characteristics. The β-OH value thereof is more preferably 0.6 mm$^{-1}$ or less, still more preferably 0.5 mm$^{-1}$ or less, yet still more preferably 0.4 mm$^{-1}$ or less.

Meanwhile, regulating the β-OH value of the substrate to 0.05 mm$^{-1}$ or larger is preferred because this is effective in heightening glass production efficiency and enhancing property of bubbles, etc. without necessity of melting in an extreme dry atmosphere or highly reducing the water content of raw materials. The β-OH value thereof is more preferably 0.1 mm$^{-1}$ or larger, still more preferably 0.2 mm$^{-1}$ or larger.

The β-OH value can be regulated by changing the composition of the glass for the substrate, selecting a heat source for melting, changing the melting time, or selecting raw materials.

The substrate preferably has a devitrification temperature of 1,400° C. or lower. In cases when the devitrification temperature thereof is 1,400° C. or lower, the forming equipment can be made to have lower member temperatures in forming the glass, making it possible to prolong the lives of the members. The devitrification temperature thereof is more preferably 1,350° C. or lower, still more preferably 1,330° C. or lower, especially preferably 1,300° C. or lower.

The devitrification temperature of a glass is determined by placing crushed particles of the glass on platinum dishes, heat-treating the glass particles for 17 hours in electric furnaces each having a controlled constant temperature, examining the heat-treated samples with an optical microscope to measure a maximum temperature at which crystal precipitation has occurred in the surface of and inside the glass and a minimum temperature at which crystal precipitation has not occurred, and averaging the maximum and minimum temperatures.

The glass constituting the substrate is a solid which is amorphous and shows a glass transition. Neither a crystallized glass which is a mixture of a glass and a crystalline substance nor a sintered glass containing a crystalline filler is included. The crystallinity of a glass may be determined, for example, by X-ray diffractometry. In cases when no clear diffraction peak is observed in an examination by X-ray diffractometry, then this glass can be ascertained to be amorphous.

Although a process for producing the glass substrate will be described later in detail, the glass substrate is formed by melting glass raw materials and hardening the melt. Methods for producing the substrate are not particularly limited. However, use can be made of, for example, a method in which a general molten glass is formed by the float process into a sheet having a given thickness, annealed, and then cut into a desired shape to obtain a sheet glass.

The composition of the glass constituting the substrate is explained below. In this description, the expression "substantially not contained" means that the glass does not contain a component other than the component mixed therein as unavoidable impurities from raw materials, etc. Namely, that expression means that the component is not purposely incorporated, and the content thereof is about 0.1% by mole or less. However, the content thereof is not limited to such values.

It is preferable that the glass includes $SiO_2$ as a main component. In this description, the expression "as a main component" means that the content of $SiO_2$ is the highest among the contents of components in mole percentage on an oxide basis. $SiO_2$ is a network-forming substance. The content thereof is more preferably 40% or higher, still more preferably 45% or higher, yet still more preferably 50% or higher, especially preferably 55% or higher, because such $SiO_2$ contents are effective in improving the glass-forming ability and weatherability and in inhibiting devitrification. Meanwhile, from the standpoint of attaining satisfactory glass meltability, the content thereof is preferably 75% or less, more preferably 74% or less, still more preferably 73% or less, yet still more preferably 72% or less.

The total content of $Al_2O_3$ and $B_2O_3$ (the content of $Al_2O_3$ may be 0) is preferably 1% or higher, more preferably 3% or higher, still more preferably 5% or higher, yet still more preferably 7% or higher, because such total contents are effective in enhancing the meltability of the glass, etc. Meanwhile, the total content of $Al_2O_3$ and $B_2O_3$ is preferably 40% or less, more preferably 37% or less, still more preferably 35% or less, yet still more preferably 33% or less, because such total contents are effective in heightening the low-dielectric-loss characteristics of the substrate while maintaining the meltability of the glass, etc.

The content molar ratio represented by $\{Al_2O_3/(Al_2O_3+B_2O_3)\}$ is preferably 0.45 or less, more preferably 0.4 or less, still more preferably 0.3 or less, because such content molar ratios are effective in enhancing the low-dielectric-loss characteristics of the glass substrate. The content molar ratio represented by $\{Al_2O_3/(Al_2O_3+B_2O_3)\}$ is preferably 0 or larger (including 0), more preferably 0.01 or larger, still more preferably 0.05 or larger.

The content of $Al_2O_3$ is preferably 15% or less, more preferably 14% or less, still more preferably 10% or less, because such $Al_2O_3$ contents are effective in improving the meltability of the glass, etc. Although the glass may not contain $Al_2O_3$, the content of $Al_2O_3$, when it is contained, is more preferably 0.5% or higher, since $Al_2O_3$ is a component effective in improving the weatherability, inhibiting the glass from separating into phases, reducing the coefficient of thermal expansion, etc.

The content of $B_2O_3$ is preferably 30% or less, more preferably 28% or less, still more preferably 26% or less, yet still more preferably 24% or less, especially preferably 23% or less, because such $B_2O_3$ contents are effective in making the acid resistance and the strain point satisfactory. Meanwhile, since $B_2O_3$ is a component effective in improving the melting reactivity, lowering the devitrification temperature, etc., the content thereof is preferably 9% or higher, more preferably 13% or higher, still more preferably 16% or higher.

Examples of alkaline-earth metal oxides include MgO, CaO, SrO, and BaO. These alkaline-earth metal oxides each function as a component enhancing the melting reactivity of the glass. The total content of such alkaline-earth metal oxides is preferably 13% or less, more preferably 11% or less, still more preferably 10% or less, yet still more preferably 8% or less, especially preferably 6% or less, because such total contents are effective in enhancing the low-dielectric-loss characteristics of the glass substrate. Meanwhile, from the standpoint of keeping the meltability of the glass satisfactory, the total content of alkaline-earth metal oxides is preferably 0.1% or higher, more preferably 3% or higher, still more preferably 5% or higher.

Although MgO is not essential, it is a component which can heighten the Young's modulus without increasing the specific gravity. That is, MgO is a component capable of heightening the specific modulus. By incorporating MgO, the problem of deflection can be alleviated and the fracture toughness value can be improved to enhance the glass strength. MgO is also a component which improves the meltability. Although MgO is not an essential component, the content thereof is preferably 0.1% or higher, more preferably 1% or higher, still more preferably 3% or higher, because such MgO contents can sufficiently provide the effects of MgO incorporation and are effective in inhibiting the coefficient of thermal expansion from becoming too low. Meanwhile, from the standpoint of inhibiting the devitrification temperature from rising, the content of MgO is preferably 13% or less, more preferably 11% or less, still more preferably 9% or less.

CaO has a characteristics of heightening the specific modulus second behind MgO among the alkaline-earth metal oxides, and of not excessively lowering the strain point. CaO is a component improving the meltability like MgO. CaO is also a component characterized by being less prone to heighten the devitrification temperature as compared with MgO. Although CaO is not an essential component, the content thereof is preferably 0.1% or higher, more preferably 1% or higher, still more preferably 3% or higher, because such CaO contents can sufficiently provide the effects of CaO incorporation. Meanwhile, from the standpoints of preventing the average coefficient of thermal expansion from becoming too high and of inhibiting the devitrification temperature from rising to prevent the glass from devitrifying when produced, the content of CaO is preferably 13% or less, more preferably 10% or less, still more preferably 8% or less.

SrO is a component which improves the meltability of the glass without heightening the devitrification temperature thereof. Although SrO is not an essential component, the content thereof is preferably 0.1% or higher, more preferably 0.5% or higher, still more preferably 1% or higher, yet still more preferably 1.5% or higher, especially preferably 2% or higher, because such SrO contents can sufficiently provide the effect of SrO incorporation. Meanwhile, the content of SrO is preferably 13% or less, more preferably 10% or less, still more preferably 7% or less, especially preferably 5% or less, because such SrO contents are effective in inhibiting the average coefficient of thermal expansion from becoming too high without excessively increasing the specific gravity.

Although BaO is not essential, it is a component which improves the meltability of the glass without elevating the devitrification temperature thereof. However, the glass containing a large amount of BaO tends to have a large specific gravity, a reduced Young's modulus, a heightened relative permittivity, and too high average coefficient of thermal expansion. Consequently, the content of BaO is preferably 10% or less, more preferably 8% or less, still more preferably 5% or less, yet still more preferably 3% or less. It is especially preferable that BaO is substantially not contained.

The contents of the components of the glass which were shown above are used to determine a value represented by the Expression 1 below. It is preferable that the value of the Expression 1 is 300 or less, since stress generated in the substrate is reduced even when the substrate is strained by a difference in thermal expansion and hence the substrate has improved thermal-shock resistance. The value represented by Expression 1 is more preferably 280 or less, still more preferably 250 or less, yet still more preferably 220 or less, especially preferably 200 or less. Although there is no particular lower limit thereon, the value represented by Expression 1 is preferably 100 or larger from the standpoint of obtaining thermal properties suitable for forming.

$$(1.02 \times SiO_2 + 3.42 \times Al_2O_3 + 0.74 \times B_2O_3 + 9.17 \times MgO + 12.55 \times CaO + 13.85 \times SrO + 14.44 \times BaO + 31.61 \times Na_2O + 20.35 \times K_2O)$$

Expression 1

Examples of alkali metal oxides include $Li_2O$, $Na_2O$, $K_2O$, $Rb_2O$, and $Cs_2O$. The total content of such alkali metal oxides is preferably 5% or less, more preferably 3% or less, still more preferably 1% or less, yet still more preferably 0.2% or less, especially preferably 0.1% or less, most preferably 0.05% or less, from the standpoint of heightening the low-dielectric-loss characteristics of the glass substrate. Meanwhile, the total content thereof is preferably 0.001% or higher, more preferably 0.002% or higher, still more preferably 0.003% or higher, yet still more preferably 0.005% or higher, because such total contents are effective in obtaining practical glass meltability and glass substrate production efficiency without necessitating excessive raw-material purification and in regulating the coefficient of thermal expansion of the glass substrate.

$Na_2O$ and $K_2O$ are especially important among those alkali metal oxides, and it is preferable that the total content of $Na_2O$ and $K_2O$ is in the range of 0.001-5%.

The incorporation of $Na_2O$ and $K_2O$ in combination is preferred because this inhibits alkali components from moving and is hence able to enhance the low-dielectric-loss characteristics of the glass substrate. That is, the content molar ratio represented by $\{Na_2O/(Na_2O+K_2O)\}$ is preferably 0.01-0.99, more preferably 0.98 or less, still more preferably 0.95 or less, yet still more preferably 0.9 or less. Meanwhile, the content molar ratio represented by $\{Na_2O/(Na_2O+K_2O)\}$ is preferably 0.02 or larger, more preferably 0.05 or larger, still more preferably 0.1 or larger.

Besides containing the components described above, the glass may contain, for example, $Fe_2O_3$, $TiO_2$, $ZrO_2$, ZnO, $Ta_2O_5$, $WO_3$, $Y_2O_3$, $La_2O_3$, etc. as optional components. Among these, $Fe_2O_3$ is a component which controls the light-absorbing performances, e.g., infrared-absorbing performance and ultraviolet-absorbing performance, of the glass substrate. According to need, Fe can be incorporated in an amount up to 0.012% in terms of $Fe_2O_3$ amount. In cases when the content of Fe is 0.012% or less, the low-dielectric-loss characteristics and ultraviolet transmittance of the glass substrate can be maintained. In the case where the glass contains Fe, the content thereof is more preferably 0.01% or less, still more preferably 0.005% or less, from the standpoint of improving the ultraviolet transmittance. Heightening the ultraviolet transmittance of the glass substrate makes it possible to use an ultraviolet-curable material in laminating steps, etc. in producing high-frequency devices, antennas, etc., thereby heightening the efficiency of producing the high-frequency devices, antennas, etc.

Meanwhile, it is preferable that the glass substrate contains Fe in an amount of 0.05% or larger in terms of $Fe_2O_3$ amount according to need, because this can enhance the ultraviolet-shielding ability. The content of Fe is more preferably 0.07% or higher, still more preferably 0.1% or higher. By thus enhancing the ultraviolet-shielding ability of the glass substrate, the glass substrate can be made to function as a protective material in cases when resins which are deteriorated by ultraviolet light are used as members.

<Process for Producing the Glass Substrate>

A process for producing the glass substrate includes: a melting step in which raw materials for glass are heated to obtain a molten glass; a refining step in which the molten glass is degassed; a forming step in which the molten glass is formed into a sheet shape to obtain a glass ribbon; and an annealing step in which the glass ribbon is gradually cooled to a room-temperature state. The glass substrate may be produced also by forming the molten glass into a block shape and subjecting the formed glass to annealing and then to cutting and polishing.

In the melting step, raw materials are prepared so as to result in a desired glass-substrate composition, continuously introduced into a melting furnace, and heated preferably at about 1,450° C.-1,750° C. to obtain a molten glass.

Usable as the raw materials are oxides, carbonates, nitrates, hydroxides, halides including chlorides, etc. In the case where the melting or refining step includes a step in which the molten glass comes into contact with platinum, there are cases where minute platinum particles are released into the molten glass and undesirably come as contamination into the glass substrate to be obtained. The use of raw-material nitrates has the effect of preventing the formation of platinum contamination.

Usable as the nitrates are strontium nitrate, barium nitrate, magnesium nitrate, calcium nitrate, and the like. It is more preferred to use strontium nitrate. With respect to raw-material particle sizes, use can be suitably made of raw materials ranging from a particle diameter which is large, e.g., several hundred micrometers, to such a degree that the particles do not remain unmelted, to a particle diameter which is small, e.g., about several micrometers, to such a degree that the particles neither fly off during raw-material conveyance nor aggregate to form secondary particles. Particles formed by granulation are also usable.

The moisture contents of raw materials can be suitably regulated in order to prevent the raw materials from flying off. Melting conditions including β-OH value and the degree of Fe oxidation-reduction (redox [$Fe^{2+}/(Fe^{2+}+Fe^{3+})$]) can be suitably regulated before the raw materials are used.

The refining step is a step for degassing the molten glass obtained in the melting step. In the fining step, use may be made of a method of degassing by depressurization or a method in which the molten glass is degassed by heating to a temperature higher than the melting temperature of the raw materials. In steps for producing glass substrates of embodiments, $SO_3$ or $SnO_2$ can be used as a refining agent.

Preferred $SO_3$ sources are sulfates of at least one element selected from the group consisting of Al, Na, K, Mg, Ca, Sr, and Ba. More preferred are sulfates of alkaline-earth metals. Especially preferred of these are $CaSO_4.2H_2O$, $SrSO_4$, and $BaSO_4$, which are highly effective in enlarging the bubbles.

In the method of degassing by depressurization, it is preferred to use a halogen, such as Cl or F, as a refining agent.

Preferred Cl sources are chlorides of at least one element selected from the group consisting of Al, Mg, Ca, Sr, and Ba. More preferred are chlorides of alkaline-earth metals. Especially preferred of these are $SrCl_2.6H_2O$ and $BaCl_2.2H_2O$, because these chlorides are highly effective in enlarging the bubbles and have low deliquescence.

Preferred F sources are fluorides of at least one element selected from the group consisting of Al, Na, K, Mg, Ca, Sr, and Ba. More preferred are fluorides of alkaline-earth metals. Preferred of these is $CaF_2$ which is highly effective in enhancing the meltability of the raw materials for glass.

Tin compounds represented by $SnO_2$ evolve $O_2$ gas in the glass melt. In the glass melt, $SnO_2$ is reduced to SnO at temperatures not lower than 1,450° C. to evolve $O_2$ gas and thereby have the function of considerably enlarging the bubbles. In producing glass substrates of embodiments, raw materials for glass are melted by heating to about 1,450-1,750° C. and, hence, the bubbles in the glass melt are more effectively enlarged.

In the case of using $SnO_2$ as a refining agent, the amount of tin compounds in the raw materials is regulated such that the content thereof is 0.01% or higher in terms of $SnO_2$ amount with respect to the total amount of the base composition described above taken as 100%. Regulating the $SnO_2$ content to 0.01% or higher is preferred because the refining function is obtained in melting the raw materials for glass. The content of $SnO_2$ is more preferably 0.05% or higher, still more preferably 0.10% or higher. Meanwhile, regulating the $SnO_2$ content to 0.3% or less is preferred because the glass is inhibited from having a color or devitrifying. The content of tin compounds in the alkali-free glass is more preferably 0.25% or less, still more preferably 0.2% or less, especially preferably 0.15% or less, in terms of $SnO_2$ amount with respect to the total amount of the base composition taken as 100%.

The forming step is a step in which the molten glass which has been degassed in the refining step is formed into a sheet shape to obtain a glass ribbon. In the forming step, known methods for forming a glass into a sheet shape can be used, such as a float process in which a molten glass is poured onto a molten metal, e.g., tin, and thereby formed into a sheet shape to obtain a glass ribbon, an overflow downdraw process (fusion process) in which a molten glass is caused to flow downward from a trough-shaped member, and a slit downdraw process in which a molten glass is caused to flow downward through a slit.

The annealing step is a step in which the glass ribbon obtained in the forming step is cooled to a room-temperature state under controlled cooling conditions. In the annealing step, the glass ribbon is cooled so that in the temperature range of from the annealing point to the strain point of the formed glass, the glass ribbon is cooled at a given average cooling rate R (° C./min) and that the glass ribbon is further cooled gradually to a room-temperature state under given conditions. The annealed glass ribbon is cut to obtain a glass substrate.

The given average cooling rate R [cooling rage (R)] is explained below.

In case where the cooling rate (R) in the annealing step is too high, the cooled glass is prone to have a residual strain therein. In addition, the too high cooling rate (R) results in an increase in equivalent cooling rate, which is a parameter reflecting fictive temperature, making it impossible to obtain low-dielectric-loss characteristics. It is hence preferred to set the R so as to result in an equivalent cooling rate of 800° C./min or less. The equivalent cooling rate is more preferably 400° C./min or less, still more preferably 100° C./min or less, especially preferably 50° C./min or less. Meanwhile, in case where the cooling rate is too low, the step requires too long a time period, resulting in a decrease in production efficiency. It is hence preferred to set the R so as to result in an equivalent cooling rate of 0.1° C./min or higher. The equivalent cooling rate is more preferably 0.5° C./min or higher, still more preferably 1° C./min or higher.

A definition of the equivalent cooling rate and a method for evaluation thereof are as follows.

A glass having a composition to be examined, which has been processed into rectangular parallelepipeds having dimensions of 10 mm×10 mm×0.3-2.0 mm, is held at [strain point]+170° C. for 5 minutes using an infrared heating type electric furnace and then cooled to room temperature (25° C.). In this operation, cooling rates ranging from 1° C./min to 1,000° C./min are used for the cooling to produce a plurality of glass samples.

A precision refractometer (e.g., KPR2000, manufactured by Shimadzu Device Corp.) is used to measure the refractive index $n_d$ for d-line (wavelength, 587.6 nm) of each of the plurality of glass samples. For the measurement, a V-block method or a minimum deviation method may be used. The obtained values of $n_d$ are plotted against the logarithm of cooling rate, thereby obtaining a calibration curve showing a relationship between $n_d$ and the cooling rate.

Next, the $n_d$ of a glass having the same composition actually produced by the steps of melting, forming, cooling, etc. is measured by the measuring method shown above. A corresponding cooling rate which corresponds to the measured value of $n_d$ (in this embodiment, the corresponding cooling rate is referred to as equivalent cooling rate) is determined from the calibration curve.

Although a process for producing the glass substrate was described above, production processes are not limited to the embodiment. Modifications, improvements, etc. within a range where the objects of the present invention can be attained are included in the present invention. For example, in producing a glass substrate of the present invention, a molten glass may be directly formed into a sheet shape by press molding.

In the case of producing a glass substrate of the present invention, besides a production process in which a melting furnace made of a refractory material is used, the glass substrate may be produced by a method in which a crucible made of platinum or an alloy including platinum as a main component (hereinafter referred to as platinum crucible) is used as a melting furnace or a clarifier. In the case of using a platinum crucible in a melting step, raw materials are prepared so as to result in the composition of the glass substrate to be obtained and the platinum crucible containing the raw materials is heated in an electric furnace preferably to about 1,450° C.-1,700° C. A platinum stirrer is inserted thereinto to stir the contents for 1-3 hours to obtain a molten glass.

In a forming step in glass sheet production steps in which a platinum crucible is used, the molten glass is poured, for example, on a carbon board or into a mold and is thereby formed into a sheet or block shape. In an annealing step, the formed glass is held typically at a temperature higher than the glass transition point Tg by about 50° C., thereafter cooled to around the strain point at a rate of about 1-10° C./min, and then cooled to a room-temperature state at a cooling rate which does not result in a residual strain. The glass sheet or block is then cut into a given shape and polished, thereby obtaining a glass substrate. The glass substrate obtained by the cutting may be heated to, for example, a temperature of about Tg+50° C. and then gradually cooled to a room-temperature state at a given cooling rate. Thus, the equivalent cooling temperature of the glass can be regulated.

<High-Frequency Circuit, Liquid-Crystal Antenna>

The glass substrate of the present invention is suitable for use as a substrate for circuit boards for high-frequency devices (electronic devices) such as semiconductor devices for use in, for example, communication appliances such as mobile telephones, smartphones, personal digital assistants, and Wi-Fi appliances, surface acoustic wave (SAW) devices, radar components such as radar transceivers, etc. and suitable for use as a substrate for components of antennas such as liquid-crystal antennas, etc. The substrate of the present invention is more suitable for use as a substrate for high-frequency circuits to be used in high-frequency devices and for liquid-crystal antennas, because the substrate is especially effective in reducing the dielectric loss of high-frequency signals and has excellent thermal-shock resistance.

In the case of the substrate for high-frequency circuits, the present invention is especially suitable for high-frequency devices in which high-frequency signals, especially signals having a frequency higher than 30 GHz, in particularly, 35 GHz or higher, are handled. Thus, the transmission loss of such high-frequency signals can be reduced, making it possible to improve the quality, strength, and other properties of the high-frequency signals.

The substrate of the present invention is suitable also for use as a perforated substrate produced using, for example, a laser. The substrate not only is effective in improving the quality, strength, and other properties of high-frequency signals as stated above but also has high resistance to thermal shocks during perforation.

Figure 1:
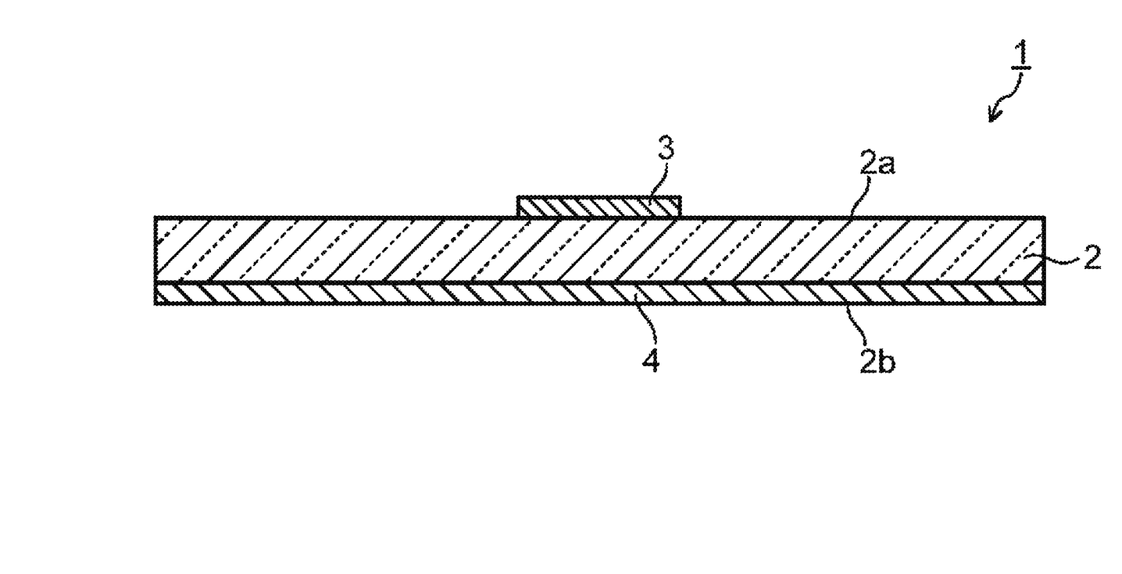
FIG. 1 is a cross-sectional view showing one example of the configuration of a high-frequency circuit.

An example (cross-sectional view) of the configuration of a high-frequency circuit for use in high-frequency devices is shown in FIG. 1. The circuit board 1 includes a glass substrate 2 having insulating properties, a first wiring layer 3 formed on a first main surface 2a of the glass substrate 2, and a second wiring layer 4 formed on a second main surface 2b of the glass substrate 2. The first and second wiring layers 3 and 4 form microstrip lines as an example of transmission lines. The first wiring layer 3 constitutes a signal line, and the second wiring layer 4 constitutes a ground line. However, the structures of the first and second wiring layers 3 and 4 are not limited to those, and a wiring layer may have been formed on only either of the main surfaces of the glass substrate 2.

The first and second wiring layers 3 and 4 are layers each constituted of a conductor, and the thickness thereof is usually about 0.1-50 μm.

The conductors constituting the first and second wiring layers 3 and 4 are not particularly limited, and use is made, for example, of a metal such as copper, gold, silver, aluminum, titanium, chromium, molybdenum, tungsten, platinum, or nickel, or an alloy or metal compound containing at least one of these metals.

The structures of the first and second wiring layers 3 and 4 are not limited to single-layer structures, and the first and second wiring layers 3 and 4 each may have a multilayer structure such as a laminated structure composed of a titanium layer and a copper layer. Methods for forming the first and second wiring layers 3 and 4 are not particularly limited, and use can be made of any of various known formation methods such as a printing method using a conductor paste, dipping method, plating, vapor deposition, and sputtering.

By using the glass substrate of the present invention in high-frequency circuits, the circuit boards can be reduced in transmission loss at high-frequencies. Specifically, the transmission loss at a frequency of, for example, 35 GHz can be reduced to preferably 1 dB/cm or less, more preferably 0.5 dB/cm or less. Consequently, the quality, strength, and other properties of high-frequency signals, in particular, high-frequency signals having a frequency exceeding 30 GHz, especially 35 GHz or higher, are maintained. It is hence possible to provide glass substrates and circuit boards which are suitable for high-frequency devices in which such high-frequency signals are handled. Thus, the characteristics and quality of high-frequency devices in which high-frequency signals are handles can be improved.

Meanwhile, among substrates for high-frequency circuits, there are substrates called universal substrates or perforated substrates, etc. Such a substrate includes an insulating sheet of base material that has through holes and copper-foil lands formed thereon in a regular pattern (e.g., lattice pattern) arrangement and that further has copper-foil wiring lines formed thereon by etching which connect several of the lands. A laser or the like is used for forming the through holes and for the etching. Examples of the laser include an excimer laser, an infrared laser, a $CO_2$ laser, and a UV laser.

In forming through holes or performing etching, the glass substrate undergoes a temperature difference therein to receive a thermal shock. However, since the glass substrate of the present invention has high thermal-shock resistance, this glass substrate does not crack even upon reception of the thermal shock and withstands the formation of through holes and the etching.

A liquid-crystal antenna is an antenna for satellite communication which can be controlled with respect to the direction of radio waves to be transmitted or received, using the liquid-crystal technology. Liquid-crystal antennas are suitable for use mainly on vehicles such as ships, airplanes, and motor vehicles. Since liquid-crystal antennas are expected to be used mainly outdoors, the liquid-crystal antennas are required not only to have stable properties under a wide temperature range but also to have resistance to thermal shocks due to abrupt temperature changes such as, for example, temperature changes occurring in movements between on the ground and in the sky or occurring in squalls in scorching deserts.

Use of the glass substrate of the present invention in liquid-crystal antennas makes it possible to provide stable properties over a wide temperature range. Furthermore, since the glass substrate has resistance to abrupt temperature changes, the liquid-crystal antennas can be used without suffering cracking. Use of the glass substrate in this application is hence preferred.

EXAMPLES

The present invention is explained below in detail by reference to Examples, but the invention is not limited thereto.

Examples 1 to 26

Glass substrates having the compositions shown in Tables 1 to 4 and having thicknesses of 0.5-10 mm and a shape of 50×50 mm were prepared. The glass substrates were produced by a melting method using a platinum crucible. Raw materials including silica sand were mixed together so as to result in a glass amount of 1 kg, thereby preparing each batch. Thereto were added 0.1-1% of sulfate in terms of $SO_3$ amount, 0.16% of F, and 1% of Cl in mass percentage on an oxide basis, with respect to 100% of the raw materials for the desired composition. The raw materials were placed in the platinum crucible and melted by heating in an electric furnace at a temperature of 1,650° C. for 3 hours to obtain a molten glass.

In the melting, a platinum stirrer was inserted into the platinum crucible to stir the melt for 1 hour, thereby homogenizing the glass. The molten glass was poured onto a carbon plate and formed into a sheet shape, and the sheet-shaped glass was placed in an electric furnace having a temperature of about Tg+50° C. and held therein for 1 hour. The electric furnace was thereafter cooled to a temperature of Tg−100° C. at a cooling rate of 1° C./min and then allowed to cool until the glass cooled to room temperature.

The glass was thereafter cut and polished to obtain a glass sheet. The end surfaces were chamfered (C/R chamfering) with a chamfering device. Examples of the glass-sheet chamfering device include the device described in JP-A-2008-49449, which is a device for chamfering glass sheet end surfaces using a rotary grindstone. The rotary grindstone may be either a resin-bonded grindstone or a metal-bonded grindstone. Examples of abrasive grains for use in such grindstones include any one of diamond, cubic boron nitride (CBN), alumina ($Al_2O_3$), silicon carbide (SiC), pumice, garnet, and the like or a combination of two or more thereof.

In Tables 1 to 4, Total RO*[1] means the total content of alkaline-earth metal oxides (MgO+CaO+SrO+BaO), and Total $R_2O$*[2] means the total content of alkali metal oxides ($Na_2O+K_2O$).

The glass substrates obtained were examined for Expression 1, Young's modulus, average coefficient of thermal expansion at 50-350° C., Expression 2, relative permittivity (20° C.) at 10 GHz and 35 GHz, dielectric loss tangent (20° C.) at 10 GHz and 35 GHz, Vickers hardness, cracking load, density, specific modulus, porosity, transmittance for light having 350-nm wavelength (converted transmittance for thickness of 0.3-0.4 mm), β-OH value, and devitrification temperature.

The Expression 1 is a value calculated from the contents of components in mole percentage on an oxide basis, using below calculation:

$$\{1.02 \times SiO_2 + 3.42 \times Al_2O_3 + 0.74 \times B_2O_3 + 9.17 \times MgO + 12.55 \times CaO + 13.85 \times SrO + 14.44 \times BaO + 31.61 \times Na_2O + 20.35 \times K_2O\}.$$

The Expression 2 is a value represented by {[Young's modulus (GPa)]×[average coefficient of thermal expansion at 50-350° C. (ppm/° C.)]}.

The values of Expression 1 are shown in Tables 1 to 4, and the other results are shown in Tables 5 to 8. In the tables, each numeral given in parentheses is a value determined by calculation, and each blank or "-" indicates that no measurement was made.

The methods used for determining the properties are shown below.

(Young's Modulus)

In accordance with the method specified in JIS Z 2280, a glass having a thickness of 0.5-10 mm was examined by an ultrasonic pulse method. The unit is GPa.

(Average Coefficient of Thermal Expansion)

In accordance with the method specified in JIS R3102 (year 1995), a differential thermodilatometer was used to conduct a measurement in the temperature range of 50-350° C. The unit is ppm/° C.

(Relative Permittivity, Dielectric Loss Tangent)

In accordance with the method specified in JIS R1641 (year 2007), a measurement was made with a cavity resonator and a vector network analyzer. The measuring frequencies were 35 GHz and 10 GHz, which were air resonance frequencies for the cavity resonator.

(Vickers Hardness)

In accordance with the method specified in JIS R1610 (year 2003), the Vickers hardness of a glass was measured under a load of 100 gf.

(Cracking Load)

In the air having a relative humidity of about 40%, a Vickers indenter (diamond indenter) having the shape of a square pyramid was pushed into a glass surface for 30 seconds. A pushing load at which cracks occur outward from all the four corners of the indentation in a proportion of 50% is taken as the cracking load. The cracking load can be determined with a commercial Vickers hardness tester. The cracking load is an average for 10 or more indentations.

(Density)

A glass lump weighing about 20 g and containing no bubbles was examined for density by Archimedes method. The unit is g/cm$^3$.

(Porosity)

The porosity of a glass substrate was determined by examining the bubbles contained therein with an optical microscope, determining the number and diameters of the bubbles, and calculating the volume of bubbles contained per unit volume.

(Transmittance)

The transmittance of a mirror-polished glass having a given thickness was measured with a visible-ultraviolet spectrophotometer. The external transmittance including a loss due to reflection was measured as the transmittance and was shown as a converted value corresponding to a glass thickness of 0.3-0.4 mm.

(β-OH Value)

β-OH values were determined by the method described in the embodiment shown above. The unit is mm$^{-1}$.

(Specific Modulus)

The specific modulus was determined by calculation from the measured values of density and Young's modulus. The unit is GPa·cm$^3$/g.

(Devitrification Temperature)

The devitrification temperature of a glass was determined by placing crushed particles of the glass on platinum dishes, heat-treating the glass particles for 17 hours in electric furnaces each having a controlled constant temperature, examining the heat-treated samples with an optical microscope to measure a maximum temperature at which crystal precipitation had occurred inside the glass and a minimum temperature at which crystal precipitation had not occurred, and averaging the maximum and minimum temperatures.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Composition [mol %] | $SiO_2$ | 68.0 | 69.5 | 71.0 | 62.0 | 71.1 | 66.1 | 100 |
|  | $Al_2O_3$ | 4.0 | 5.5 | 4.0 | 8.0 | 1.1 | 11.3 | 0 |
|  | $B_2O_3$ | 21.0 | 15.0 | 21.3 | 23.0 | 0.0 | 7.8 | 0 |
|  | $Al_2O_3 + B_2O_3$ | 25.0 | 20.5 | 25.3 | 31.0 | 1.1 | 19.1 | 0 |
|  | MgO | 0.0 | 3.0 | 0.0 | 4.0 | 6.9 | 5.1 | 0 |
|  | CaO | 1.0 | 4.0 | 0.0 | 2.0 | 8.3 | 4.5 | 0 |
|  | SrO | 6.0 | 3.0 | 3.8 | 0.8 | 0.0 | 5.2 | 0 |
|  | BaO | 0.0 | 0.0 | 0.0 | 0.2 | 0.0 | 0.0 | 0 |
|  | Total RO*[1] | 7.0 | 10.0 | 3.8 | 7.0 | 15.2 | 14.8 | 0 |
|  | $Na_2O$ | 0.009 | 0.007 | 0.012 | 0.01 | 12.4 | 0.07 | 0 |
|  | $K_2O$ | 0.003 | 0.004 | 0.006 | 0.005 | 0.2 | 0.01 | 0 |
|  | Total $R_2O$*[2] | 0.012 | 0.011 | 0.018 | 0.015 | 12.6 | 0.08 | 0 |
|  | $Fe_2O_3$ | 0.002 | 0.001 | 0.003 | 0.01 | 0.04 | 0.003 | 0 |
| Ratio | $Al_2O_3/(Al_2O_3 + B_2O_3)$ | 0.16 | 0.27 | 0.16 | 0.26 | 1 | 0.59 | — |
|  | $Na_2O/(Na_2O + K_2O)$ | 0.75 | 0.64 | 0.67 | 0.67 | 0.98 | 0.88 | — |
|  | Expression 1 | 195 | 220 | 155 | 184 | 640 | 290 | 102 |

TABLE 2

|  |  | Ex. 8 | Ex. 9 | Ex. 10 | Ex. 11 | Ex. 12 | Ex. 13 |
|---|---|---|---|---|---|---|---|
| Composition [mol %] | $SiO_2$ | 62.0 | 60.0 | 60.0 | 58.0 | 62.0 | 58.0 |
|  | $Al_2O_3$ | 10.0 | 10.0 | 10.0 | 10.0 | 8.0 | 10.0 |
|  | $B_2O_3$ | 21.0 | 23.0 | 26.0 | 26.0 | 23.0 | 25.0 |
|  | $Al_2O_3 + B_2O_3$ | 31.0 | 33.0 | 36.0 | 36.0 | 31.0 | 0.0 |
|  | MgO | 2.0 | 2.0 | 1.0 | 3.0 | 2.0 | 2.0 |
|  | CaO | 3.0 | 3.0 | 2.0 | 2.0 | 3.0 | 3.0 |
|  | SrO | 2.0 | 2.0 | 1.0 | 1.0 | 2.0 | 2.0 |
|  | BaO | 0.0 | 0.0 | 0.0 | 0.0 | 0.0 | 0.0 |
|  | Total RO*[1] | 7.0 | 7.0 | 4.0 | 6.0 | 7.0 | 7.0 |
|  | $Na_2O$ | 0.010 | 0.015 | 0.008 | 0.003 | 0.005 | 0.005 |
|  | $K_2O$ | 0.003 | 0.003 | 0.005 | 0.001 | 0.001 | 0.001 |
|  | Total $R_2O$*[2] | 0.013 | 0.018 | 0.013 | 0.004 | 0.006 | 0.006 |
|  | $Fe_2O_3$ | 0.008 | 0.007 | 0.006 | 0.007 | 0.008 | 0.009 |
| Ratio | $Al_2O_3/(Al_2O_3 + B_2O_3)$ | 0.32 | 0.30 | 0.28 | 0.28 | 0.26 | 0.29 |
|  | $Na_2O/(Na_2O + K_2O)$ | 0.77 | 0.83 | 0.62 | 0.75 | 0.83 | 0.83 |
|  | Expression 1 | 197 | 197 | 163 | 179 | 191 | 196 |

TABLE 3

|  |  | Ex. 14 | Ex. 15 | Ex. 16 | Ex. 17 | Ex. 18 | Ex. 19 |
|---|---|---|---|---|---|---|---|
| Composition [mol %] | $SiO_2$ | 60.0 | 60.0 | 60.0 | 60.0 | 60.0 | 60.0 |
|  | $Al_2O_3$ | 8.0 | 10.0 | 5.0 | 2.0 | 0.0 | 0.0 |
|  | $B_2O_3$ | 25.0 | 23.0 | 28.0 | 31.0 | 33.0 | 36.0 |
|  | $Al_2O_3 + B_2O_3$ | 33.0 | 33.0 | 33.0 | 33.0 | 33.0 | 36.0 |
|  | MgO | 2.0 | 4.0 | 2.0 | 2.0 | 2.0 | 1.0 |
|  | CaO | 3.0 | 2.0 | 3.0 | 3.0 | 3.0 | 2.0 |
|  | SrO | 2.0 | 1.0 | 2.0 | 2.0 | 2.0 | 1.0 |
|  | BaO | 0.0 | 0.0 | 0.0 | 0.0 | 0.0 | 0.0 |
|  | Total RO*[1] | 7.0 | 7.0 | 7.0 | 7.0 | 7.0 | 4.0 |
|  | $Na_2O$ | 0.005 | 0.005 | 0.005 | 0.005 | 0.005 | 0.005 |
|  | $K_2O$ | 0.001 | 0.001 | 0.001 | 0.001 | 0.001 | 0.001 |
|  | Total $R_2O$*[2] | 0.006 | 0.006 | 0.006 | 0.006 | 0.006 | 0.006 |
|  | $Fe_2O_3$ | 0.008 | 0.010 | 0.006 | 0.006 | 0.005 | 0.005 |
| Ratio | $Al_2O_3/(Al_2O_3 + B_2O_3)$ | 0.24 | 0.30 | 0.15 | 0.06 | 0.00 | 0.00 |
|  | $Na_2O/(Na_2O + K_2O)$ | 0.83 | 0.83 | 0.83 | 0.83 | 0.83 | 0.83 |
|  | Expression 1 | 191 | 188 | 183 | 175 | 169 | 136 |

TABLE 4

|  |  | Ex. 20 | Ex. 21 | Ex. 22 | Ex. 23 | Ex. 24 | Ex. 25 | Ex. 26 |
|---|---|---|---|---|---|---|---|---|
| Composition [mol %] | $SiO_2$ | 60.0 | 63.0 | 62.0 | 64.0 | 65.0 | 62.0 | 64.0 |
|  | $Al_2O_3$ | 10.0 | 8.0 | 8.0 | 9.0 | 10.0 | 7.2 | 8.5 |

TABLE 4-continued

|  |  | Ex. 20 | Ex. 21 | Ex. 22 | Ex. 23 | Ex. 24 | Ex. 25 | Ex. 26 |
|---|---|---|---|---|---|---|---|---|
|  | $B_2O_3$ | 21.0 | 16.0 | 23.0 | 18.5 | 14.0 | 23.0 | 18.5 |
|  | $Al_2O_3 + B_2O_3$ | 31.0 | 24.0 | 31.0 | 27.5 | 24.0 | 30.2 | 27.0 |
|  | MgO | 2.0 | 4.0 | 4.0 | 2.5 | 4.0 | 4.3 | 2.5 |
|  | CaO | 3.0 | 5.0 | 2.0 | 3.5 | 5.0 | 2.5 | 4.0 |
|  | SrO | 4.0 | 3.0 | 1.0 | 2.5 | 2.0 | 1.0 | 2.5 |
|  | BaO | 0.0 | 1.0 | 0.0 | 0.0 | 0.0 | 0.0 | 0.0 |
|  | Total RO*[1] | 9.0 | 13.0 | 7.0 | 8.5 | 11.0 | 7.8 | 9.0 |
|  | $Na_2O$ | 0.01 | 0.012 | 0.004 | 0.006 | 0.005 | 0.005 | 0.008 |
|  | $K_2O$ | 0.002 | 0.003 | 0.001 | 0.001 | 0.001 | 0.001 | 0.002 |
|  | Total $R_2O$*[2] | 0.012 | 0.015 | 0.005 | 0.007 | 0.006 | 0.006 | 0.010 |
|  | $Fe_2O_3$ | 0.008 | 0.010 | 0.010 | 0.003 | 0.002 | 0.005 | 0.005 |
| Ratio | $Al_2O_3/(Al_2O_3 + B_2O_3)$ | 0.32 | 0.33 | 0.26 | 0.33 | 0.42 | 0.24 | 0.31 |
|  | $Na_2O/(Na_2O + K_2O)$ | 0.83 | 0.80 | 0.80 | 0.86 | 0.83 | 0.83 | 0.80 |
|  | Expression 1 | 223 | 259 | 183 | 211 | 238 | 190 | 216 |

TABLE 5

|  | Ex. 1 | Ex. 2 | Ex. 3 | Ex. 4 | Ex. 5 | Ex. 6 | Ex. 7 |
|---|---|---|---|---|---|---|---|
| Young's modulus [GPa] | 58 | 66 | (51) | 59 | 73 | 76 | 74 |
| Average coefficient of thermal expansion [ppm/° C.] | 3.4 | 3.3 | (2.8) | 3.2 | 8.5 | 3.8 | 0.7 |
| Expression 2 | 197 | 218 | (143) | 189 | 621 | 289 | 52 |
| Relative permittivity @ 10 GHz | 4.47 | 4.62 | 3.96 | 4.36 | (6.80) | 5.49 | 3.75 |
| Relative permittivity @ 35 GHz | 4.39 | 4.57 | 4.09 | 4.35 | 7.13 | 5.41 | 3.87 |
| Dielectric loss tangent @ 10 GHz (×$10^{-3}$) | 1.79 | 2.42 | 1.22 | 1.80 | (22.0) | 6.20 | 0.11 |
| Dielectric loss tangent @ 35 GHz (×$10^{-3}$) | 2.48 | 3.04 | 1.82 | 2.61 | 20.9 | 8.98 | 0.15 |
| Vickers hardness |  |  |  | 530 |  | 570 |  |
| Cracking load [N] |  |  |  | Higher than 19.6N |  | 9.8-19.6N |  |
| Density [g/cm$^3$] | 2.32 | 2.34 | (2.24) | 2.26 | 2.49 | 2.50 | 2.20 |
| Specific modulus [GPa · cm$^3$/g] | 25 | 28 | 23 | 26 | 29 | 30 | 34 |
| Porosity [%] | 0 | 0 | 0 | 0 | 0 | 0 | 0 |
| Transmittance [%] (0.3-0.4 mmt) | 90 | 90 | 90 | 90 | 90 | 90 | 93 |
| β-OH [mm$^{-1}$] | 0.21 | 0.34 | — | 0.48 | 0.19 | 0.28 | — |
| Devitrification temperature [° C.] | 1200° C. or less | 1200° C. or less | 1200° C. or less | 1220 | 1000° C. or less | 1270 | — |

TABLE 6

|  | Ex. 8 | Ex. 9 | Ex. 10 | Ex. 11 | Ex. 12 | Ex. 13 |
|---|---|---|---|---|---|---|
| Young's modulus [GPa] | 62 | 61 | 58 | 59 | 58 | 59 |
| Average coefficient of thermal expansion [ppm/° C.] | (3.0) | (3.1) | (2.7) | (2.9) | 3.3 | (3.1) |
| Expression 2 | (190) | (189) | (158) | (171) | 193 | (186) |
| Relative permittivity @ 10 GHz | 4.56 | 4.56 | 4.34 | 4.42 | 4.41 | 4.53 |
| Relative permittivity @ 35 GHz | 4.59 | 4.58 | 4.39 | 4.43 | 4.43 | 4.55 |
| Dielectric loss tangent @ 10 GHz (×$10^{-3}$) | 2.20 | 2.16 | 1.59 | 1.88 | 1.86 | 1.99 |
| Dielectric loss tangent @ 35 GHz (×$10^{-3}$) | 3.27 | 3.25 | 2.32 | 2.74 | 2.86 | 3.38 |
| Density [g/cm$^3$] | 2.30 | 2.30 | 2.25 | 2.26 | 2.27 | 2.29 |
| Specific modulus [GPa · cm$^3$/g] | 27 | 27 | 26 | 26 | 26 | 26 |
| Porosity [%] | 0 | 0 | 0 | 0 | 0 | 0 |
| Transmittance [%] (0.3-0.4 mmt) | 90 | 90 | 90 | 90 | 90 | 90 |
| β-OH [mm$^{-1}$] | (0.35) | (0.35) | (0.35) | (0.35) | 0.43 | (0.35) |
| Devitrification temperature [° C.] | 1330 | 1295 | 1420° C. or more | 1420° C. or more | 1170 | 1310 |

TABLE 7

|  | Ex. 14 | Ex. 15 | Ex. 16 | Ex. 17 | Ex. 18 | Ex. 19 |
|---|---|---|---|---|---|---|
| Young's modulus [GPa] | 57 | 61 | 53 | (42) | (39) | (35) |
| Average coefficient of thermal expansion [ppm/° C.] | (3.1) | (2.9) | (3.2) | (3.3) | (3.4) | (3.0) |
| Expression 2 | (180) | (179) | (172) | (140) | (130) | (104) |
| Relative permittivity @ 10 GHz | 4.44 | 4.48 | 4.27 | 4.04 | 3.86 | 3.77 |
| Relative permittivity @ 35 GHz | 4.46 | 4.51 | 4.26 | 4.10 | 3.84 | 3.79 |
| Dielectric loss tangent @ 10 GHz ($\times 10^{-3}$) | 1.81 | 1.99 | 1.55 | 1.29 | 1.60 | 1.74 |
| Dielectric loss tangent @ 35 GHz ($\times 10^{-3}$) | 2.76 | 2.98 | 2.39 | 1.94 | 1.85 | 2.01 |
| Density [g/cm$^3$] | 2.27 | 2.28 | 2.23 | (2.20) | (2.17) | (2.11) |
| Specific modulus [GPa · cm$^3$/g] | 25 | 27 | 24 | 19 | 18 | 16 |
| Porosity [%] | 0 | 0 | 0 | 0 | 0 | 0 |
| Transmittance [%] (0.3-0.4 mmt) | 90 | 90 | 90 | — | — | — |
| β-OH [mm$^{-1}$] | 0.48 | (0.35) | 0.52 | (0.35) | (0.35) | (0.35) |
| Devitrification temperature [° C.] | 1160 | 1340 | 1040 | — | — | — |

TABLE 8

|  | Ex. 20 | Ex. 21 | Ex. 22 | Ex. 23 | Ex. 24 | Ex. 25 | Ex. 26 |
|---|---|---|---|---|---|---|---|
| Young's modulus [GPa] | (59) | (64) | (59) | (64) | (70) | 59 | 64 |
| Average coefficient of thermal expansion [ppm/° C.] | (3.4) | (3.8) | 3.1 | 3.4 | (3.4) | 3.5 | 3.5 |
| Expression 2 | (200) | (241) | (184) | (214) | (238) | 208 | 223 |
| Relative permittivity @ 10 GHz | (4.83) | (5.12) | 4.38 | 4.66 | 4.89 | 4.36 | 4.63 |
| Relative permittivity @ 35 GHz | (4.85) | (5.12) | 4.34 | 4.63 | 4.84 | 4.36 | 4.61 |
| Dielectric loss tangent @ 10 GHz ($\times 10^{-3}$) | (2.97) | (4.01) | 1.79 | 2.45 | 3.18 | 1.74 | 2.36 |
| Dielectric loss tangent @35 GHz ($\times 10^{-3}$) | (4.23) | (5.44) | 2.64 | 3.40 | 4.80 | 2.63 | 3.56 |
| Density [g/cm$^3$] | (2.36) | (2.42) | (2.26) | (2.33) | (2.38) | (2.26) | (2.33) |
| Specific modulus [GPa · cm$^3$/g] | 25 | 26 | 26 | 27 | 29 | 26 | 27 |
| Porosity [%] | 0 | 0 | 0 | 0 | 0 | 0 | 0 |
| Transmittance [%] (0.3-0.4 mmt) | 90 | 90 | 90 | 90 | 90 | 90 | 90 |
| β-OH [mm$^{-1}$] | (0.35) | (0.35) | (0.35) | (0.35) | (0.35) | 0.49 | 0.53 |
| Devitrification temperature [° C.] | — | — | 1230 | 1220 | 1300 | 1290 | 1350 |

As Tables 5 to 8 show, the product (value represented by Expression 2) of the coefficient of thermal expansion and the Young's modulus in each of the glass substrates of the present invention is as small as 300 or less. These glass substrates are hence less apt to suffer tensile stress even when undergoing an abrupt temperature difference. As a result, the glass substrates can be inhibited from being damaged by use environments involving an abrupt temperature change or by processing steps which are apt to cause a temperature difference.

Furthermore, since the glass substrates of the present invention each have a relative permittivity at 20° C. and 35 GHz of 10 or less and a dielectric loss tangent at 20° C. and 35 GHz of 0.006 or less, the glass substrates can attain a reduction in dielectric loss in a high-frequency range.

Moreover, the glass substrates of the present invention can be processed under small load because of their low Vickers hardnesses and are less apt to have defects such as microcracks because of their high cracking loads, and consequently the glass substrates of the present invention are obtained as high-strength substrates.

While the invention has been described in detail and with reference to specific embodiments thereof, it is apparent to one skilled in the art that various changes and modifications can be made therein without departing from the spirit and scope thereof. This application is based on a Japanese patent application filed on Mar. 20, 2018 (Application No. 2018-53082), the entire contents thereof being incorporated herein by reference. All the references cited here are incorporated herein as a whole.

INDUSTRIAL APPLICABILITY

The glass substrate of the present invention is highly effective in reducing the dielectric loss of high-frequency signals and shows high thermal-shock resistance. Consequently, circuit boards employing the glass substrate are highly reduced in the transmission loss of high-frequency signals and have excellent suitability for processing using heat such as a laser.

Such glass substrate and circuit board are very useful as members for the whole high-frequency electronic devices in which high-frequency signals of higher than 10 GHz, especially signals of higher than 30 GHz, particularly signals of 35 GHz or higher are handled, as members for liquid-crystal antennas used in environments where temperature fluctuations are large, or as members for devices or the like requiring perforation with a laser, etc.

REFERENCE SIGNS LIST

1 Circuit board
2 Glass substrate
2a First main surface
2b Second main surface
3 First wiring layer
4 Second wiring layer

The invention claimed is:

1. A glass substrate comprising, in mole percentage on an oxide basis:
40 to 75% of $SiO_2$;
0.5 to 15% of $Al_2O_3$;
0.1 to 9% of MgO;
0 to 8% of CaO;
0.1 to 13% of SrO; and
0 to 10% of BaO, and
satisfying the following relationship:

$$\{[\text{Young's modulus (GPa)}] \times [\text{average coefficient of thermal expansion at 50-350° C. (ppm/° C.)}]\} \leq 300 \text{ (GPa·ppm/° C.)}, \text{ and}$$

having a relative permittivity as measured at 20° C. and 35 GHz of 10 or less and a dielectric loss tangent as measured at 20° C. and 35 GHz of 0.006 or less.

2. The glass substrate according to claim 1, having the Young's modulus of 70 GPa or less.

3. The glass substrate according to claim 1, having the average coefficient of thermal expansion at 50-350° C. of 5 ppm/° C. or less.

4. The glass substrate according to claim 1, having a relative permittivity as measured at 20° C. and 10 GHz of 10 or less and a dielectric loss tangent as measured at 20° C. and 10 GHz of 0.006 or less.

5. The glass substrate according to claim 1, having an area of a main surface of 100 $cm^2$-100,000 $cm^2$ and a thickness of 0.01 mm-2 mm.

6. The glass substrate according to claim 1, wherein at least a part of an end surface thereof is chamfered.

7. The glass substrate according to claim 1, having a Vickers hardness of 400-550.

8. The glass substrate according to claim 1, having a cracking load of higher than 1.96 N.

9. The glass substrate according to claim 1, having a density of 2.5 $g/cm^3$ or less.

10. The glass substrate according to claim 1, having a compressive stress layer formed in at least a part of a surface of the main surface.

11. The glass substrate according to claim 1, having a porosity of 0.1% or less.

12. The glass substrate according to claim 1, having a transmittance for light having 350-nm wavelength of 50% or higher.

13. The glass substrate according to claim 1, having a β-OH value of 0.05 $mm^{-1}$-0.8 $mm^{-1}$.

14. The glass substrate according to claim 1, comprising $SiO_2$ as a main component, and in mole percentage on an oxide basis,
comprising $Al_2O_3$ and $B_2O_3$ in a total amount of 1-40%, having a content molar ratio represented by $\{Al_2O_3/(Al_2O_3+B_2O_3)\}$ of 0-0.45, and
comprising one or more alkaline-earth metal oxides in a total amount of 0.1-13%.

15. The glass substrate according to claim 1, comprising one or more alkali metal oxides in a total amount of 0.001-5% in mole percentage on an oxide basis.

16. The glass substrate according to claim 15, having a content molar ratio represented by $\{Na_2O/(Na_2O+K_2O)\}$ of 0.01-0.99, among the alkali metal oxides.

17. The glass substrate according to claim 1, satisfying the following relationship of contents in mole percentage on an oxide basis:

$$\{1.02 \times SiO_2+3.42 \times Al_2O_3+0.74 \times B_2O_3+9.17 \times MgO+ 12.55 \times CaO+13.85 \times SrO+14.44 \times BaO+31.61 \times Na_2O+20.35 \times K_2O\} \leq 300.$$

18. The glass substrate according to claim 1, comprising $Al_2O_3$ in an amount of 0-10% and $B_2O_3$ in an amount of 9-30% in mole percentage on an oxide basis.

19. The glass substrate according to claim 1, comprising Fe in an amount of 0-0.012% in terms of $Fe_2O_3$ in mole percentage on an oxide basis.

20. The glass substrate according to claim 1, which is for use in a liquid-crystal antenna or a high-frequency circuit.

21. A liquid-crystal antenna comprising the glass substrate according to claim 1.

22. A high-frequency device comprising the glass substrate according to claim 1.

* * * * *